Sept. 19, 1950     H. WILLEY     2,523,171
TRACTOR

Filed April 3, 1948     2 Sheets-Sheet 1

INVENTOR
HARRY WILLEY
By Bates, Teare, & McKean
ATTORNEYS

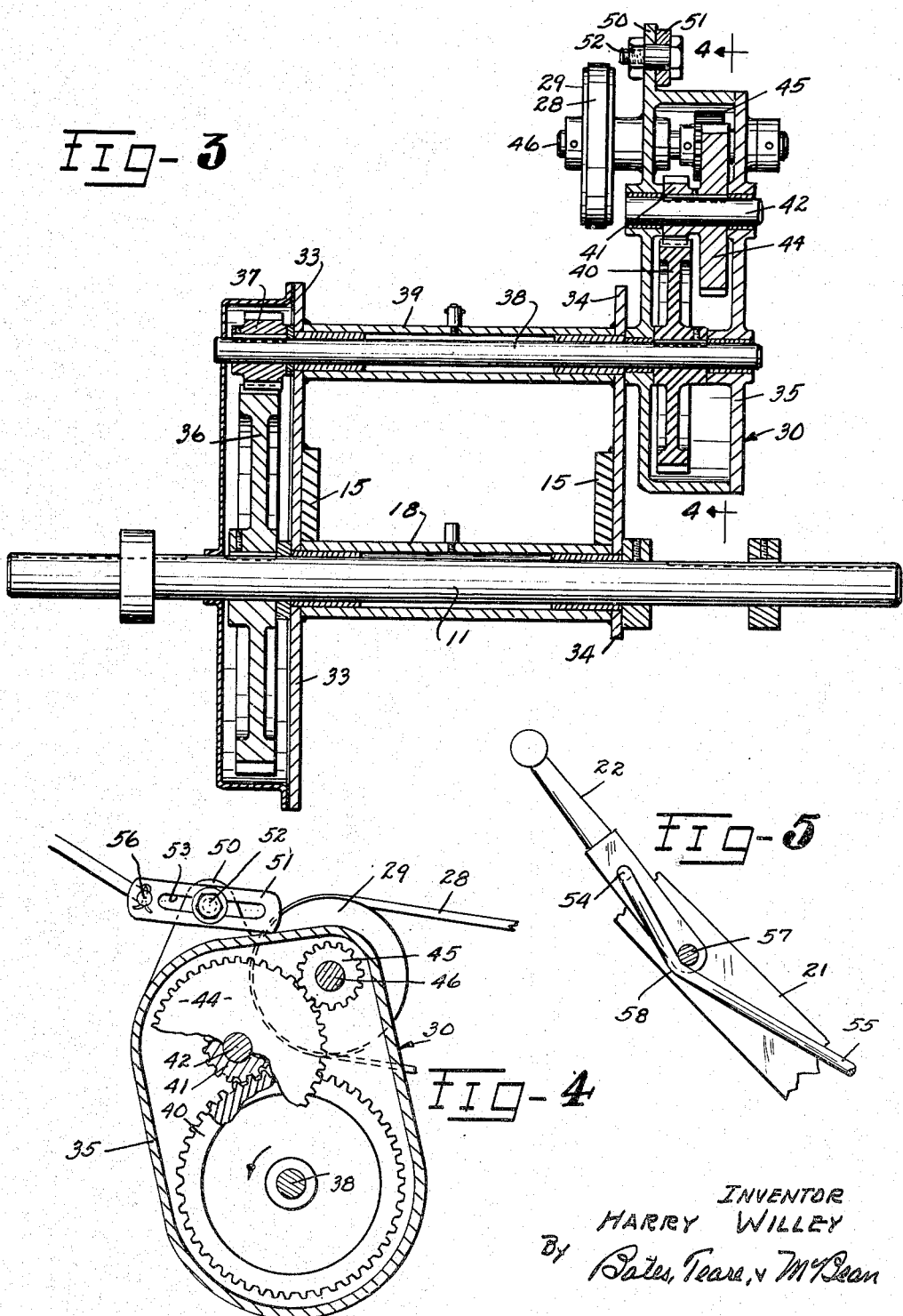

Patented Sept. 19, 1950

2,523,171

UNITED STATES PATENT OFFICE 2,523,171

TRACTOR

Harry Willey, Bedford, Ohio, assignor to The Bready Tractor and Implement Company, Solon, Ohio, a corporation of Ohio Application April 3, 1948, Serial No. 18,839

5 Claims. (Cl. 180—19)

This invention relates to a power-driven tractor, and more particularly to a two-wheel power-driven tractor of the type which is guidable by an operator who walks behind the tractor. The present invention is especially concerned with the provision of an improved driving mechanism for connecting and controlling the application of power to the driving wheels of the tractor. This, therefore, is the general object of the present invention.

Considerable difficulty has been experienced in the power drives and controls for use in small two-wheel power-driven tractors. The mechanisms used in the past have been complex in arrangement and have made the control of the application of power inconvenient and difficult for the operator who walks behind the tractor guiding the same.

An object of the present invention is to provide a small two-wheeled power-driven tractor with a power transmission and control mechanism which will be simple in operation, readily controlled, and at the same time economical to manufacture. Another object of this invention is to provide a power transmission and control mechanism which will be efficient in operation and which will be constructed to facilitate the operation of the tractor by the guiding operator who, in addition to controlling the application of power to the driving wheels, must be ever alert in guiding the tractor.

Figure 1:
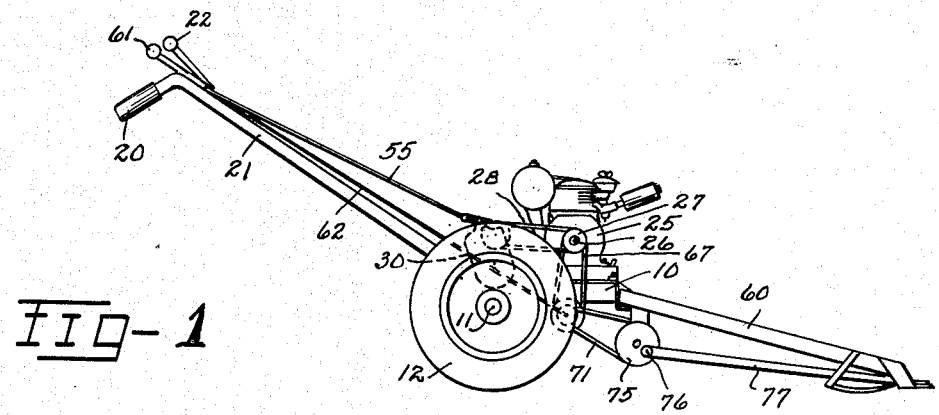
Figure 2:
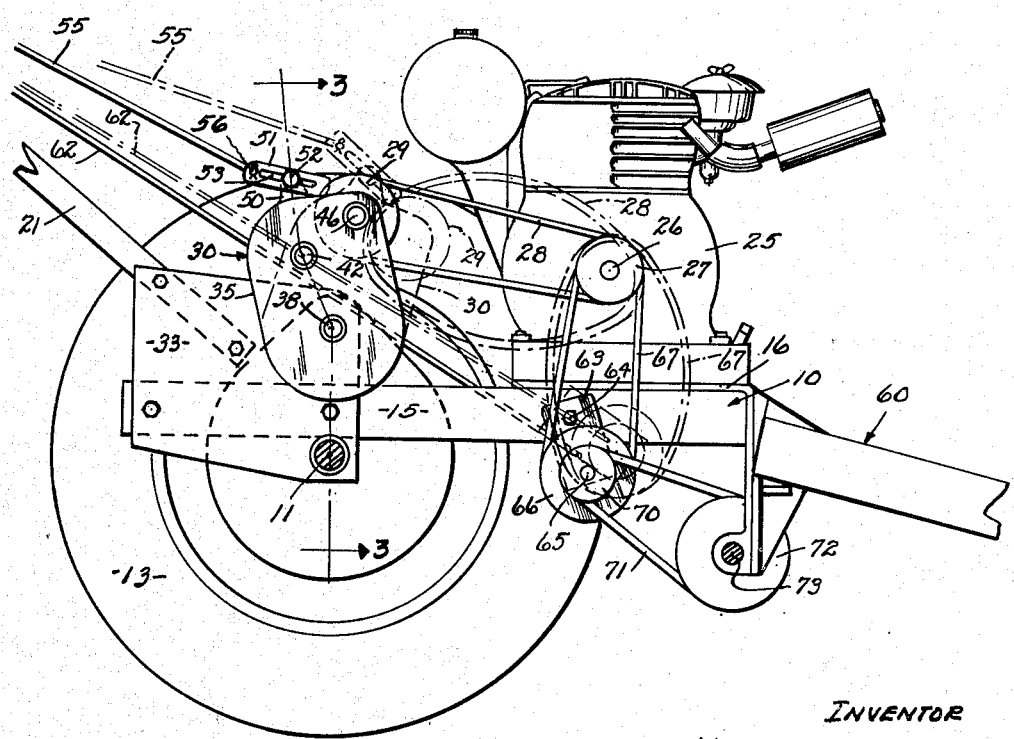

In the drawings, Fig. 1 is a side elevation of a small two-wheeled power-driven tractor having a garden implement such as, for instance, a mower mounted at the front thereof; Fig. 2 is an enlarged fragmentary side elevation of a portion of the tractor with the near driving wheel and a portion of the mower broken away, to more clearly illustrate the power transmission and control mechanisms; Fig. 3 is a vertical section on an enlarged scale, through the power transmission mechanism, the plane of the section being indicated by the offset line 3—3 on Fig. 2; Fig. 4 is a sectional detail, the plane of which is indicated by the line 4—4 on Fig. 3; and Fig. 5 is a sectional detail of a control lever for the power transmission mechanism.

In the drawings there is shown a two-wheel tractor including a frame indicated in general at 10, on which is journalled an axle 11 which supports wheels 12 and 13. The frame 10 preferably comprises spaced longitudinally extending side members 15 that are connected by suitable transverse frame members, one of which is indicated at 16. The tractor is guided by handles 20 which form the terminal portions of bars 21 that are attached to the frame and extend upwardly and rearwardly therefrom. The power for operating the tractor is obtained from a gasoline motor indicated in general at 25 and which is supported by the frame 10.

The present invention is particularly concerned with the power transmission mechanism which interconnects the power shaft 26 of the motor with the driving wheels 12 and 13, and with a control mechanism which may be operated by a manually operable lever 22 positioned in close proximity to the handles 20 and which controls the application of power to the driving wheels 12 and 13.

The present invention contemplates the provision of a speed reduction unit which is pivotally mounted on the frame. The driving shaft of this unit is drivingly connected to the wheels 12 and 13 and the driven shaft is connected with a drive pulley 27 mounted on the power shaft 26 of the motor 25 by a flexible driving belt 28. The arrangement of the pivotal connection is such that the swinging of the speed reduction unit 30 about its pivot increases or releases the tension on the driving belt 28 to connect or disconnect the application of power to the driving wheels. A suitable control mechanism is provided which extends from the speed reduction unit 30 to a point adjacent the handles 20, for controlling the swinging movement of the unit about its pivot and the application of power to the driving wheels 12 and 13.

As shown in the drawings, the wheel supporting axle 11 extends through and is journalled in a tube 18 which extends across the frame and which is secured to the frame members 15 as by welding. As shown in Fig. 3, the tube 18 is welded at its ends to a pair of side plates 33 and 34 which are secured to respective side frame members 15. The wheels 12 and 13 are drivingly secured to the outer ends of the axle 11 in any well-known manner.

Drivingly secured to the axle 11, between the frame plate 33 and the far wheel 13, is a gear 36 which is drivingly engaged by a pinion 37 carried by a drive shaft 38. This shaft is mounted in a tubular cross frame member 39 which extends between the two brackets 33 and 34 and is secured thereto by suitable welds. The drive shaft 38 extends entirely across the frame and provides the pivotal support for the speed reduction unit 30.

The speed reduction unit 30 comprises a housing 35 which is journalled on the shaft 38 for swinging movement about the axis thereof. Secured to the shaft 38 within the housing is a gear 40 which meshes with a pinion 41 drivingly secured to a shaft 42. This shaft is rotatably mounted in the housing 35 and carries a gear 44 which is engaged by a pinion 45 carried by a shaft 46 which is also journalled in the housing 35. Drivingly secured to one end of the shaft 46, which projects outside of the housing 35, is the pulley 29 heretofore mentioned. A flexible driving belt 28 interconnects the pulley 29 with the drive pulley 27 of the motor power shaft 26.

The speed reduction unit 30 may be rocked about the axis of the drive shaft 38 in a counterclockwise direction to tension the driving belt 28 and thus drivingly connect the motor with the driving wheels, or may be rocked in a clockwise direction (Fig. 2) to the position shown in dotted lines in Fig. 2, to release the tension on the driving belt 28, thus disconnecting the effective driving connection between the motor 25 and the driving wheels 12 and 13. An advantage of this invention results from the fact that the speed reduction unit may be swung slowly in a counterclockwise direction to tighten the belt and thus act to cause the power to be applied to the driving wheels slowly and evenly, thereby facilitating the control of the tractor.

The swinging of the speed reduction unit 30 is controlled by the operator from a position adjacent the handles 20. As shown in the drawings, particularly in Figs. 1, 2 and 5, the speed reduction unit is provided with an upstanding ear 50 which is connected with a link 51 by a bolt 52 carried by the ear 50 and passing through an elongated slot 53 in the link. Accordingly, the relative position between the link and the speed reduction unit 30 may be adjusted to control the degree of tension on the driving belt 28 without affecting the movement of the operating handle 22. The handle 22 is connected as at 54 with one end of an elongated link 55, the other end of which is pivotally connected to the link 51 as at 56.

The operating handle 22 is pivotally mounted on a rod 57 which extends between the two bars 21 which carry the handles 20. It will be noticed from Fig. 5 that the link 55 is bent as indicated at 58 so that the pivotal connection 54 between the link 55 and the handle 22 may be swung to a position across a line extending through the center of the pivotal connections 57 and 56 of the link 55. Accordingly, the tension on the driving belt 28 will retain the handle 22 in its active position.

The application of power to a power operated device, such as the mower, generally indicated at 60 as being supported at the front end of the tractor, may be controlled by the operation of a handle 61 which is similar to the handle 22. This handle is connected by a link 62 with a bracket 63 pivoted as at 64 to the frame 10 so that the movement of the handle 61 will swing the bracket back and forth between the full line and dotted line positions illustrated in Fig. 2. The bracket 64 carries a stub shaft 65 which supports a pulley 66 which is connected with a pulley carried by the power shaft 26 of the motor by a flexible driving belt 67. The shaft 65 carries a second pulley 70 which is connected by a flexible driving belt 71 with a drive pulley 72 carried by a drive shaft 73 supported by the mower. The drive shaft 73 is illustrated as being connected to the mowing mechanism, generally indicated at 73, by a disc 75 which is secured to the shaft and carries a crank 76 connected to the operating mechanism of the mower by a driving link 77. The mowing mechanism itself and the driving connection between the link 77 and such mechanism are not illustrated in detail, but may be of any of the well-known types of mechanisms ordinarily used for such purposes.

It will be seen from the foregoing description that I have provided a power-driven tractor mechanism in which the application of power both to the driving wheels and to a garden tool operated thereby may readily be controlled by an operator walking behind the tractor. It will also be seen that the arrangement of such control mechanism provides a construction which may be economically manufactured, efficient in operation, extremely simple in design, and yet which will be rugged and capable of efficiently transmitting the power from the motor to the driving wheels.

I claim:

1. In a tractor, a frame, a pair of driving wheels supporting said frame, a motor, a drive shaft carried by said frame in radial spaced relation from the axis of said wheels, a driving connection between said shaft and said wheels, a gear housing mounted for swinging movement about the axis of said shaft, a gear drivingly connected to said shaft and positioned within said housing, a shaft mounted in said housing, means within said housing and drivingly connecting said last named shaft with said gear, a pulley on said last named shaft, said pulley being movable to and from said motor consequent upon the swinging of the housing about the axis of said drive shaft, a drive pulley on said motor, and a flexible endless belt drivingly interconnecting said pulleys whereby the swinging of said housing about the axis of said first named shaft tightens or loosens said belt to establish or break the driving connection between said pulleys.

2. In a tractor, a frame, a motor mounted on said frame, an axle rotatably mounted on said frame, a pair of driving wheels secured to said axle at opposite sides of said frame, a gear on said axle between one of said driving wheels and said frame, a drive shaft journalled on said frame spaced from and parallel with said axle, a pinion on one end of said drive shaft for driving said gear, a housing pivotally mounted on the other end of said drive shaft for swinging movement to and from said motor, a second shaft journalled in said housing and movable as a unit therewith, speed reduction gearing in said housing interconnecting said shafts, a pulley on said motor, a pulley on said second named shaft, a flexible belt drivingly interconnecting said pulleys, means under control of the operator to swing said housing about its pivot to control the tension on the belt to thereby break or establish the driving connection between said pulleys, and an adjustable connection between said means and said housing.

3. In a tractor, a frame, driving wheels supporting said frame, a motor mounted on said frame, a power transmission unit pivotally mounted on said frame for swinging movement to and from said motor, a driving connection between said unit and said wheels including a shaft journalled in said frame in spaced relation from the axis of said wheels, a drive pulley on said unit to transmit power thereto, a pulley on said motor, a flexible endless belt interconnecting said pulleys, means to swing the unit about its pivot to establish and break the driving connection between said belt and pulleys to thereby control the application of power to said driving wheels, said power transmission unit including a housing pivotally mounted on said shaft, a gear drivingly mounted on said shaft within said housing, a shaft mounted in said housing, a pinion mounted on said shaft and in meshing engagement with said gear, a gear on said shaft drivingly connected with said pinion, a second shaft journalled in said housing, a pinion on said shaft and meshing with said last named gear, and wherein said last named shaft extends outside of said housing and having said drive pulley mounted thereon.

4. In a two-wheeled tractor, a frame, a pair of driving wheels supporting said frame and disposed at either side thereof, a motor mounted on said frame, a drive shaft on said frame radially spaced from the axis of said wheels, a speed reduction gear unit pivotally connected to said frame for swinging movement to and from said motor on an axis coincident with that of said drive shaft, a driving connection between said shaft and said wheels, a gear on said shaft meshing with one of the gears of said unit, a drive pulley on said unit to transmit power thereto, a pulley on said motor, a flexible driving belt interconnecting said pulleys, and means to swing the unit about its pivot to establish and break the driving connection between said belt and pulleys to thereby control the application of power to said driving wheels.

5. In a tractor, a frame, a motor mounted on said frame having a driving pulley on an axis extending transversely of said frame, an axle rotatably mounted on said frame and extending transversely thereacross, a pair of driving wheels secured to said axle at opposite sides of said frame, a drive shaft rotatably mounted in a bearing fixedly carried by said frame, a housing pivotally mounted on an axis coincident with that of the drive shaft for movement longitudinally of said frame to and from said motor, a speed reduction gear unit geared with the drive shaft and mounted in said housing and movable as a unit therewith, a pulley on said unit drivingly connected thereto, a flexible belt drivingly interconnecting said pulleys, means under control of the operator to swing said housing about its pivot to control the tension on the belt to thereby break or establish the driving connection between said pulleys, and means to lock the unit with the driving connection established.

HARRY WILLEY.

REFERENCES CITED

The following references are of record in the file of this patent:

UNITED STATES PATENTS

| Number | Name | Date |
| --- | --- | --- |
| 1,034,481 | Merritt | Aug. 6, 1912 |
| 1,437,667 | McCarthy | Dec. 5, 1922 |
| 2,066,174 | Cregier | Dec. 29, 1936 |
| 2,069,245 | Haines | Feb. 2, 1937 |
| 2,070,288 | Mack | Feb. 9, 1937 |
| 2,220,705 | Burckes | Nov. 5, 1940 |
| 2,247,333 | Funk | June 24, 1941 |
| 2,292,580 | Moyer et al. | Aug. 11, 1942 |
| 2,453,819 | Smith | Nov. 16, 1948 |
| 2,453,999 | Melling | Nov. 16, 1948 |
| 2,474,085 | Albright | June 21, 1949 |